(12) United States Patent
Li

(10) Patent No.: US 8,564,712 B2
(45) Date of Patent: Oct. 22, 2013

(54) BLUR DIFFERENCE ESTIMATION USING MULTI-KERNEL CONVOLUTION

(75) Inventor: Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 13/048,077

(22) Filed: Mar. 15, 2011

(65) Prior Publication Data

US 2012/0236170 A1 Sep. 20, 2012

(51) Int. Cl.
*G03B 13/00* (2006.01)
*H04N 5/232* (2006.01)

(52) U.S. Cl.
USPC .......................... 348/349; 348/345; 382/255

(58) Field of Classification Search
None
See application file for complete search history.

(56) References Cited

U.S. PATENT DOCUMENTS

| | | | |
|---|---|---|---|
| 7,359,576 B1 | 4/2008 | Worthington et al. | |
| 7,616,826 B2 | 11/2009 | Freeman et al. | |
| 7,657,119 B1 | 2/2010 | Georgiev et al. | |
| 2009/0316995 A1 | 12/2009 | Szeliski et al. | |
| 2010/0080482 A1* | 4/2010 | Wong et al. | 382/255 |
| 2010/0310179 A1* | 12/2010 | Chertok et al. | 382/203 |
| 2013/0058590 A1* | 3/2013 | Weiss | 382/263 |

OTHER PUBLICATIONS

Yuan, L. et al.—"Blurred/Non-Blurred Image Alignment using Sparseness Prior"—IEEE 11th Int. Conf. on Computer Vision, Oct. 14-17, 2007, Rio de Janeiro, pp. 1-8.

* cited by examiner

*Primary Examiner* — Anthony J Daniels
(74) *Attorney, Agent, or Firm* — John P. O'Banion

(57) ABSTRACT

An apparatus and method for rapidly and accurately determining blur differences between captured images. Blur change is modeled as a point spread function from a first position to a second position, which is approximated in response to performing a series of convolutions using at least two different blur kernels having different variance. The kernel with a larger variance is used first to speed processing, after which a kernel having a smaller variance is utilized to attain desired accuracy. Any number of kernels can be utilized with decreasing variance to achieve any desired level of accuracy. The apparatus and method can be utilized within a wide range of image capture and/or processing devices, and can be utilized within camera focus mechanisms to increase focusing speed and accuracy.

20 Claims, 5 Drawing Sheets

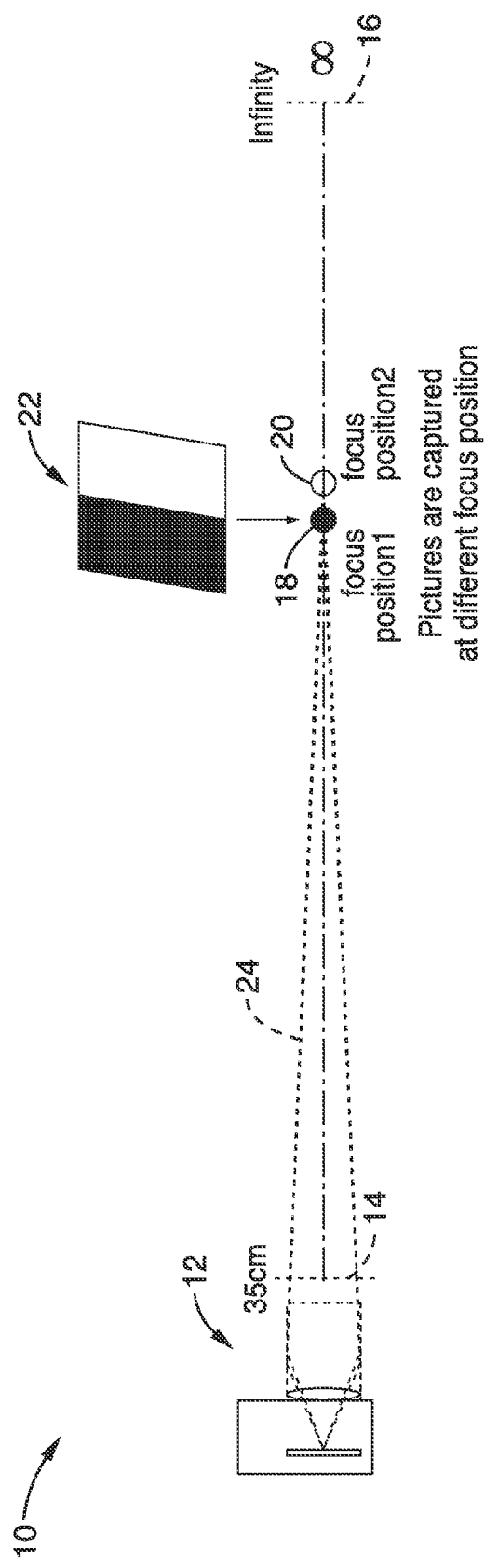
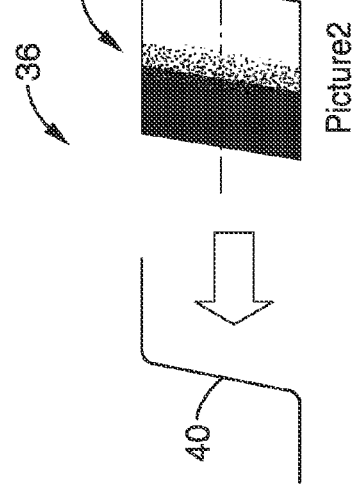
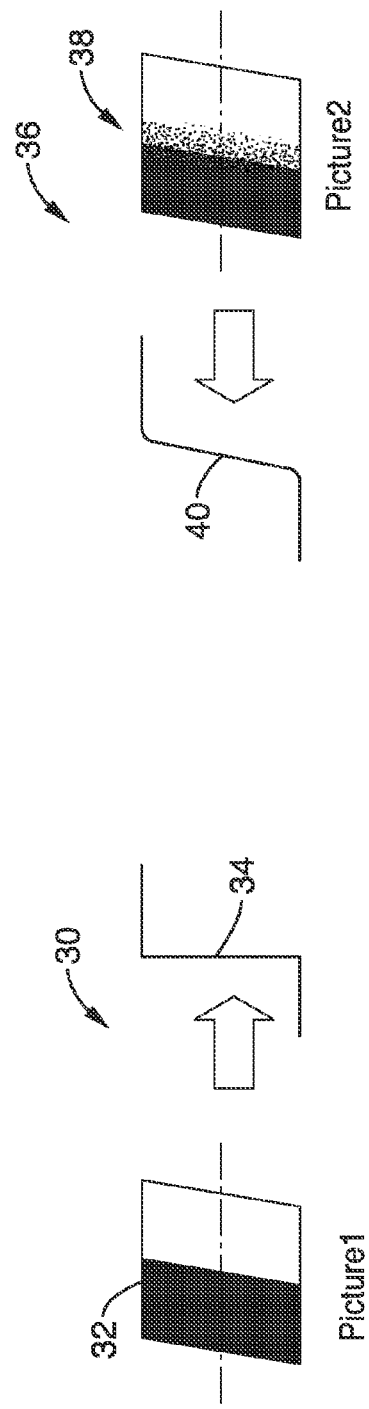
FIG. 1
FIG. 2A
FIG. 2B

BLUR DIFFERENCE ESTIMATION USING MULTI-KERNEL CONVOLUTION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image processing and acquisition, and more particularly to blur difference estimation mechanisms.

2. Description of Related Art

The estimation of blur difference between captured images can be a fundamental component within a variety of image capture and processing apparatus, such as toward estimating actual subject depth. Cameras and other optical devices can utilize blur differences between captured images of a subject to estimate depth and control focus. For example a camera may utilize present and previous depth estimations for the picture to improve focus control.

Blur change is modeled as a point spread function which may be approximated by a series of convolutions involving a blur kernel. Suppose $f_A$ and $f_B$ are two pictures captured at two different focus positions, with $f_A$ being sharper then $f_B$. Let K be the blur kernel. The blur difference between the two pictures, in terms of number of convolutions, is given by:

$$I_{A\_B} = \mathrm{argmin}_I \left\| f_A \underbrace{* K * K * \ldots * K}_{I \text{ Convolutions}} - f_B \right\|$$

The blur difference between the two pictures in terms of variance is $I_{A\_B}\sigma^2$, where $\sigma^2$ is the variance of the blur kernel K. However, there are known issues and tradeoffs which arise when performing this convolution. (1) The number of convolutions required is inversely proportional to the variance of the kernel. (2) If using a kernel with a large variance, the blur difference estimation is acquired with fewer convolutions, but at a low accuracy. (3) If using a kernel with a small variance, additional computational cost is involved, yet the resultant blur difference estimation has a higher accuracy.

Accordingly, a need exists for an apparatus and method which is capable of overcoming the convolution issues and associated tradeoffs so that blur differences can be obtained more rapidly without sacrificing accuracy.

BRIEF SUMMARY OF THE INVENTION

A blur matching apparatus and method are described which provide increased accuracy with high computational efficiency. Existing two-picture blur matching techniques calculate convolutions using a kernel whose sizing is a tradeoff between accuracy and computational efficiency. In overcoming these shortcomings the present invention determines convolution by a means of multi-kernel convolution, wherein kernels with decreasing variance are used during estimation. In particular, kernels with increasingly finer (smaller) variance are adopted during the blur estimation process, such as initially using kernels with large variances, after which smaller variance kernels are selected for refining the estimations. In this manner, the apparatus and method significantly reduces the number of convolutions necessary while providing a highly accurate blur difference estimation.

The invention is amenable to being embodied in a number of ways, including but not limited to the following descriptions.

One embodiment of the invention is an apparatus for determining blur difference between images, comprising: (a) a computer processor configured for processing images; (b) a memory coupled to the computer processor and configured for retaining images and for retaining programming executable by the computer processor; and (c) programming executable on the computer processor for determining blur difference between at least a first and a second image by, (c)(i) modeling blur change as a point spread function from a first position to a second position, (c)(ii) approximating the point spread function as a series of convolutions, (c)(iii) performing a first portion of the series of convolutions in response to using a first kernel having a first variance, and (c)(iv) performing the remaining convolutions of the series of convolutions in response to using at least a second kernel having at least a second variance which is smaller than the first kernel variance.

At least one embodiment of the invention is configured such that point spread function P from position A to B is given by $f_A * P = f_B$ in which $*$ denotes the operation of two dimensional convolution, $f_A$ represents a picture captured at position A, $f_B$ represents a picture captured at position B. At least one embodiment of the invention is configured with point spread function P approximated in response to a series of convolutions by a blur kernel K within $P = K * K * \ldots * K$. At least one embodiment of the invention has programming configured for assuming that $$I_1 = \mathrm{argmin}_I \left\| f_A \underbrace{* K_1 * K_1 * \ldots * K_1}_{I \text{ convolutions}} - f_B \right\|,$$

$$\hat{f}_A = f_A \underbrace{* K_1 * K_1 * \ldots * K_1}_{I'_1 \text{ convolutions}} \text{ where } I'_1 = \begin{cases} 0, & \text{if } I_1 = 0, \\ I_1 - 1, & \text{otherwise.} \end{cases}$$

in which $\hat{f}_A$ represents estimated blur at position A and $f_A$ represents a picture captured at position A, and $K_1$ is a first blur kernel. At least one embodiment of the invention has programming configured for determining blur difference $I_{A\_B}$ between the two kernels as $$I_{A\_B} = I'_1 \frac{\sigma_1^2}{\sigma_2^2} + \underset{l}{\operatorname{argmin}} \left\| \hat{f}_A * \underbrace{K_2 * K_2 * \ldots * K_2}_{l\ convolutions} - f_B \right\|$$

in which $\sigma_1^2$ is a variance of the first blur kernel, $\sigma_2^2$ is a variance of a second blur kernel $K_2$, $f_A$ represents a picture captured at position A, and $f_B$ represents a picture captured at position B. At least one embodiment of the invention has the above programming configured for combining the use of at least two kernels, an accuracy of blur estimation can be obtained equivalent to performing convolutions with second blur kernel variance $\sigma_2^2$, with a computational cost that is approximately equivalent to performing convolutions with first blur kernel variance $\sigma_1^2$.

At least one embodiment of the invention is configured for repeatedly invoking the combining of the at least two kernels to obtain a blur estimation of any desired level of accuracy. In at least one embodiment of the invention the apparatus comprises a camera device which performs the blur difference determination while focusing the camera device. At least one embodiment of the invention is configured so that the number of convolutions within the series of convolutions is inversely proportional to the variance of the kernel used for the convolutions.

One embodiment of the invention is an apparatus for automatically focusing an electronic image capturing device, comprising: a computer processor configured for processing images and controlling focus for an electronic image capturing device; a memory coupled to the computer processor configured for retaining images and for retaining programming executable by the computer processor; and programming executable on the computer processor for adjusting focus in response to, estimating actual subject distance in response to determining blur difference between subject images, modeling blur change as a point spread function from a first position to a second position, while determining said blur difference, approximating the point spread function as a series of convolutions, performing a first portion of the series of convolutions in response to using a first kernel having a first variance, and performing the remaining convolutions of the series of convolutions in response to using at least a second kernel having at least a second variance which is smaller than the first variance, adjusting focus of the electronic image capturing device, and iteratively performing the above steps until a desired accuracy of focus is obtained.

One embodiment of the invention is a method for determining blur difference between at least a first and a second image, comprising: modeling blur change as a point spread function from a first position to a second position; approximating, on a computer processor, the point spread function as a series of convolutions; performing a first portion of the series of convolutions in response to using a first kernel having a first variance; and performing the remaining convolutions of the series of convolutions in response to using at least a second kernel having a second variance which is smaller than the first variance.

The present invention provides a number of beneficial elements which can be implemented either separately or in any desired combination without departing from the present teachings.

An element of the invention is the estimation of blur difference using a multi-kernel convolution approach.

Another element of the invention is the use of multiple kernels with decreasing levels of variance as convolution progresses.

Another element of the invention is the ability to attain high accuracy blur estimation with fewer convolutions.

Another element of the invention is the ability to provide higher accuracy blur estimations, based on these new blur convolutions, within existing systems.

A still further element of the invention is the ability to provide higher accuracy depth estimations and focus controls at low computational overheads.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of image capture at different camera focus positions according to an element of the present invention.

FIG. 2A and FIG. 2B are step-edge image representations at the in-focus position in FIG. 2A and in an off-focus position in FIG. 2B.

DETAILED DESCRIPTION OF THE INVENTION

Figure 3:
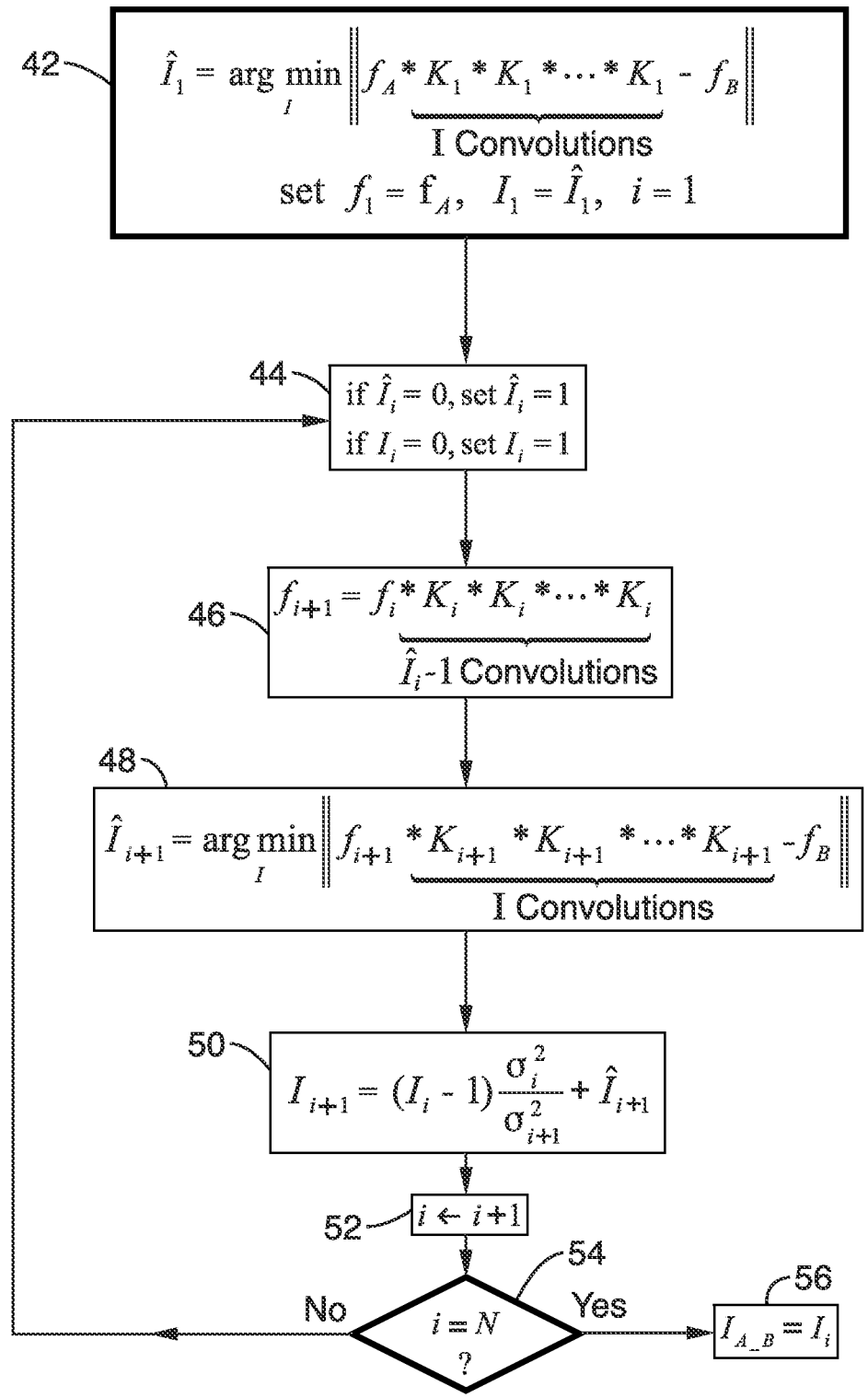
FIG. 3 is a flowchart of multi-kernel convolution according to an embodiment of the present invention.

1. Blur Difference.

Considering blur difference, it will be recognized that when a subject is in optimal focus, the captured image is the sharpest and accordingly provides the highest contrast in relation to images captured at less than optimal focus. The subject becomes increasingly blurry (less contrast) as the lens moves away from the in-focus position. Generally, when two pictures are captured (taken) of a specific subject at two different focus distances, the one captured closer to the subject distance is sharper than the other. The focus distances at which the pictures are taken and the amount of blur difference between these two pictures can be used to estimate the actual subject distance, or depth.

FIG. 1 illustrates an embodiment 10 in which multiple images are captured of a calibration target (or subject), at different focal positions (subject-distances) when characterizing a given imaging apparatus (e.g., specific make or model of image capture device). An image capture device (camera) 12 is shown which can focus from a minimum focal length 14 (e.g., in this case 35 cm) on out to infinity 16. According to the invention, the focus converges to a first focal position 18 and then to a second focal position 20, upon a calibration target 22, such as a step-edge image, slate, graticule, or similar target having known optical characteristics, along focal path 24. By way of example, the focusing distance of the camera ranges between the minimal focus distance (e.g., 35 cm) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different aspects of video capture and output.

FIG. 2B depicts the condition 36 as the image of object 38 becomes increasingly blurry as the lens moves away from the 'in-focus' position, with a resulting sloped contrast curve 40 shown. Generally, when two pictures are taken at two different focal distances, the one taken closer to the subject-distance is sharper than the other. The focal distances at which the pictures are taken and the amount of the blur difference between these two pictures can be used to estimate the actual subject distance, or depth. Before proceeding, however, it should also be appreciated that blur difference determinations can be utilized, without limitation, in a number of other image processing applications.

Consider a blur difference determination in which two pictures $f_A$ and $f_B$ are taken at positions A and B, with $f_A$ being sharper than $f_B$. The blur change can be modeled by a point spread function P from position A to position B according to $$f_A * P = f_B$$

where * denotes the operation of two dimensional convolution. Furthermore, the point spread function P can be approximated by using a series of convolutions by a blur kernel K according to $$P = K * K * \ldots * K \qquad (1)$$

For example a blur kernel K may be chosen as $$K = \frac{1}{64}\begin{pmatrix} 1 & 6 & 1 \\ 6 & 36 & 6 \\ 1 & 6 & 1 \end{pmatrix} \qquad (2)$$

in which the amount of blur difference between $f_A$ and $f_B$ can be evaluated on the basis of how many convolutions are performed in Eq. (1). In actual implementation, the blur difference is obtained by an iterative process according to $$I_{A\_B} = \operatorname*{argmin}_{I} \left\| f_A * \underbrace{K * K * \ldots * K}_{I \text{ convolutions}} - f_B \right\| \qquad (3)$$

where |.| denotes a norm operator that evaluates the blur matching error between $f_A$ and $f_B$.

2. Blur Kernel with Different Variance.

In performing convolutions, the number of convolutions required is inversely proportional to the variance of the kernel. When a kernel with a large variance is selected, the convolutions are performed rapidly, yet provide a low accuracy estimation. Conversely, utilizing kernels having a small variance provides for a slow (many iterations) convolution process, but yields high accuracy.

The present invention, however, provides a mechanism for obtaining rapid convolutions with high accuracy. Suppose two blur kernels $K_1$ and $K_2$ have variances $\sigma_1^2$ and $\sigma_2^2$, respectively:

$$I_1 = \operatorname*{argmin}_{I} \left\| f_A * \underbrace{K_1 * K_1 * \ldots * K_1}_{I \text{ convolutions}} - f_B \right\| \qquad (4)$$

$$I_2 = \operatorname*{argmin}_{I} \left\| f_A * \underbrace{K_2 * K_2 * \ldots * K_2}_{I \text{ convolutions}} - f_B \right\| \qquad (5)$$

whereby the following relation holds:

$$\frac{I_1}{I_2} \approx \frac{\sigma_2^2}{\sigma_1^2}. \qquad (6)$$

If $\sigma_1^2 > \sigma_2^2$, then by combining the use of two kernels, a blur estimation accuracy can be obtained which achieves an accuracy of using variance $\sigma_2^2$, but subject to a computational cost that is approximately the same as using variance $\sigma_1^2$.

To perform this multi-kernel convolution it is assumed that $\sigma_1^2 > \sigma_2^2$ and Eq. 4 is computed. Let $$I_1' = \begin{cases} 0, & \text{if } I_1 = 0, \\ I_1 - 1, & \text{otherwise.} \end{cases}$$

Then the assumption is made, $$\hat{f}_A = f_A * \underbrace{K_1 * K_1 * \ldots * K_1}_{I_1' \text{ convolutions}}$$

after which the blur difference with two kernels can be obtained as, $$I_{A\_B} = I_1' \frac{\sigma_1^2}{\sigma_2^2} + \operatorname*{argmin}_{I} \left\| \hat{f}_A * \underbrace{K_2 * K_2 * \ldots * K_2}_{I \text{ convolutions}} - f_B \right\| \qquad (7)$$

The blur difference between the 2 pictures in terms of variance is $I_{A\_B}\sigma_2^2$. The above convolution procedure yields the same accuracy of blur difference $I_2$ given by Eq. 5. The total number of convolutions required by Eq. 7 is $I'_1 + \hat{I}'_2$, where $$1 \le \hat{I}_2 \le 2\left(\frac{\sigma_1^2}{\sigma_2^2}\right) - 1.$$

For example, suppose 50 convolutions are necessary if a kernel $K_2$ is chosen with variance $\sigma_2^2$ (Eq. 5). Consider another kernel $K_1$ having a variance $\sigma_1^2 = 2\sigma_2^2$, which may only require 25 convolutions, yet provides lower accuracy (Eq. 4). If after using the first kernel $K_1$ for convolution (Eq.

4), then a second kernel $K_2$ is used to complete the two-kernel convolution (Eq. 7), with the total number of convolutions required at 28 as a maximum in this example; while accuracy is equal to the use of the second kernel $K_2$ (Eq. 5). The above procedure can be extended to using any desired number of kernels, such as a series of N kernels with variances given by, $$\sigma_i^2 = 2\sigma_{i+1}^2 \; i=1,\ldots N-1 \qquad (8)$$

Then the two kernel procedure can be invoked repeatedly to obtain a blur difference estimation with the same accuracy, yet with using a much smaller number of convolutions than required using the original blur kernel.

FIG. 3 illustrates an example embodiment of a general multi-kernel convolution procedure. Suppose there are two pictures $f_A$ and $f_B$, with $f_A$ being the sharper of the two, and blur kernels $K_1, K_2, \ldots, K_N$ with respective variances having the relation $\sigma_1^2 > \sigma_2^2 > \ldots > \sigma_N^2$. A convolution is commenced using first kernel $K_1$ in 42, and convolution proceeds using the next kernel. Suppose now, that convolution has finished using kernel $K_1$, then step 44 is executed, because the number of convolutions obtained from using kernel $K_i$ can be zero. In step 46 the image $f_{i+1}$ is utilized as the starting image for the next refinement through convolution. For example, after the convergence of the i th round of convolution with the i th kernel, a blur image is obtained after $\hat{I}_i$ convolutions. However, this blur image is not utilized for the next round of convolution using the next kernel with a smaller variance. It will be appreciated that image $f_{i+1}$ is obtained from one convolution step before convergence (i.e., the $(\hat{I}_1 - 1)$th convolution). This is because the convolution can slightly overshoot convergence, such as by no more than one variance value $\sigma_i^2$. So one convolution step back is then taken before refining the result using $K_{i+1}$. In step 48 the convolution using kernel $K_{i+1}$ is performed with a smaller variance $\sigma_{i+1}^2$. Step 50 depicts calculating the blur difference between the two pictures in terms of the variance $\sigma_{i+1}^2$. A loop control is incremented in step 52 and a check for completion at $K_N$ is made at step 54. If $K_N$ has not been reached, then the process returns to step 44. If, however, $K_N$ has been reached, then the final blur difference between the two pictures in terms of variance is $I_{A\_blrd\_B} \sigma_N^2$ at step 56.

Figure 4:
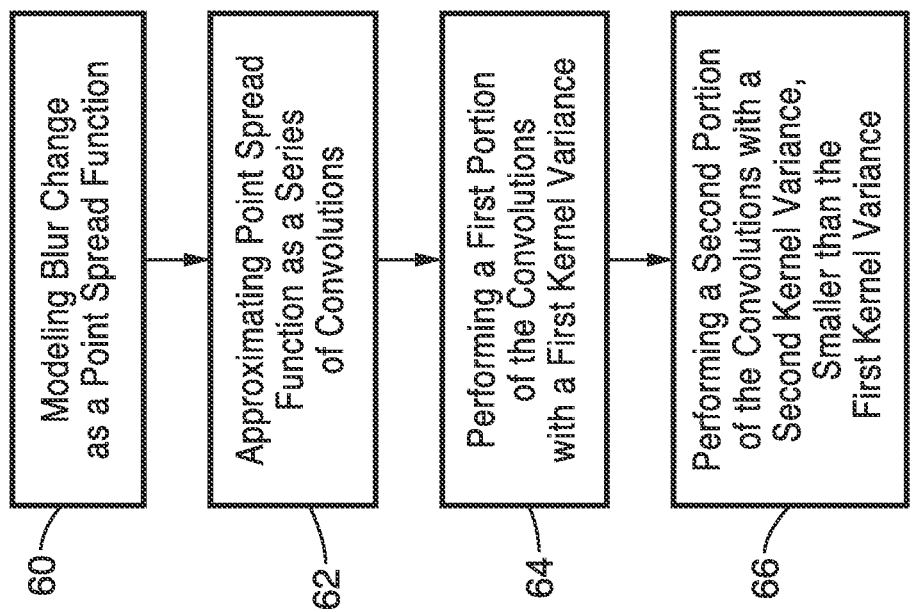
FIG. 4 is a flowchart of blur difference determination according to an embodiment of the present invention.

FIG. 4 illustrates an example embodiment of blur matching according to the invention. Modeling is performed 60 of the blur change as a Gaussian point spread function from a first position to a second position, which is approximated 62 as a series of convolutions, whose first portion is in response to using a first kernel variance 64, and whose remaining convolutions are performed 66 in response to using at least a second kernel variance which is smaller than said first kernel variance.

It should be appreciated that the determination of blur difference according to the invention can be applied to a wide range of image processing systems and devices, such as those related to absolute image focus, comparative image focusing, depth estimations, stereoscopic image processing, adjustment of image focus, and other electronic devices which can benefit from a rapid and accurate means of determining blur difference.

Figure 5:
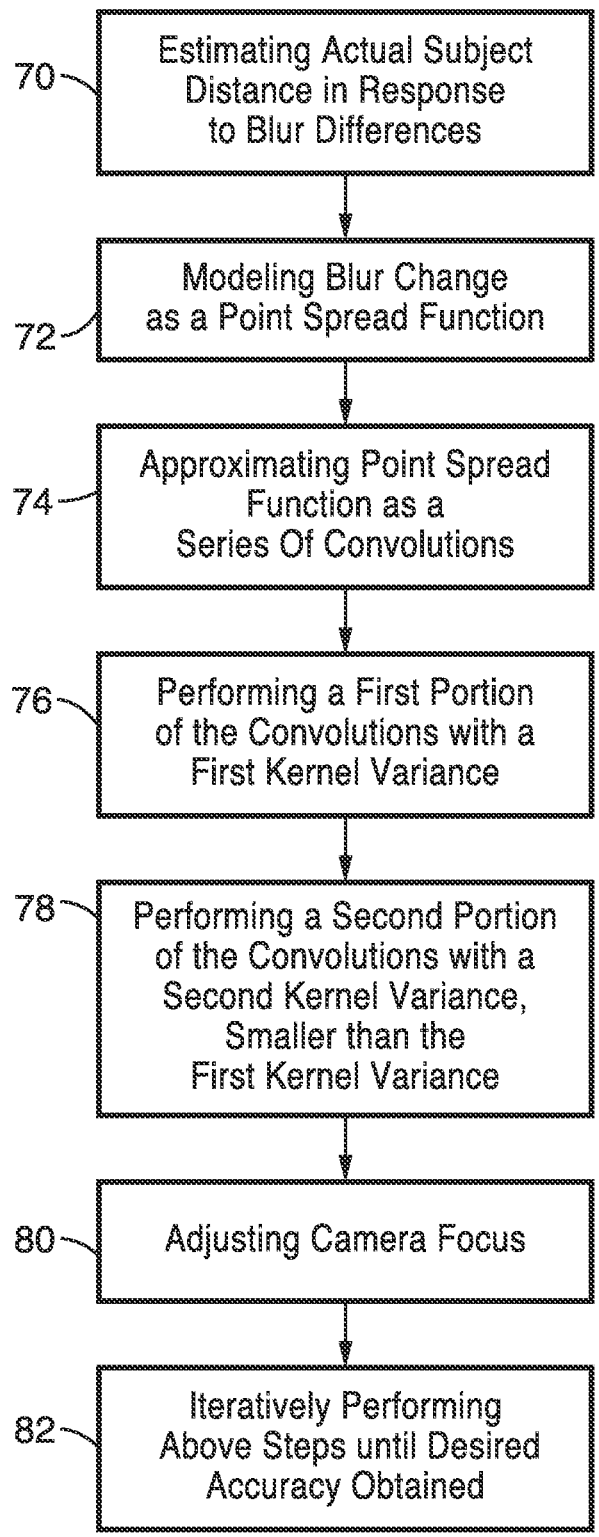
FIG. 5 is a flowchart of blur difference determination (blur matching) within the focus control system of an image capture device according to an embodiment of the present invention.

FIG. 5 illustrates an example embodiment of using the multi-kernel convolution within an image capture system which estimates 70 actual subject distance in response to blur difference. After capturing two subject images, modeling is performed 72 of the blur change as a point spread function from a first position to a second position, which is approximated 74 as a series of convolutions, whose first portion is in response to using a first kernel variance 76, and whose remaining convolutions are performed 78 in response to using at least a second kernel variance which is smaller than said first kernel variance. The camera focus is then adjusted 80, and the blur difference (70-78) and camera focusing 80, is performed again iteratively 82, until the desired focus accuracy is obtained. It should be appreciated that the present invention can be implemented on a variety of devices and systems which are configured to perform any of a number of different forms of image processing and/or image capture. By way of example and not limitation the following describes an embodiment within a camera device.

Figure 6:
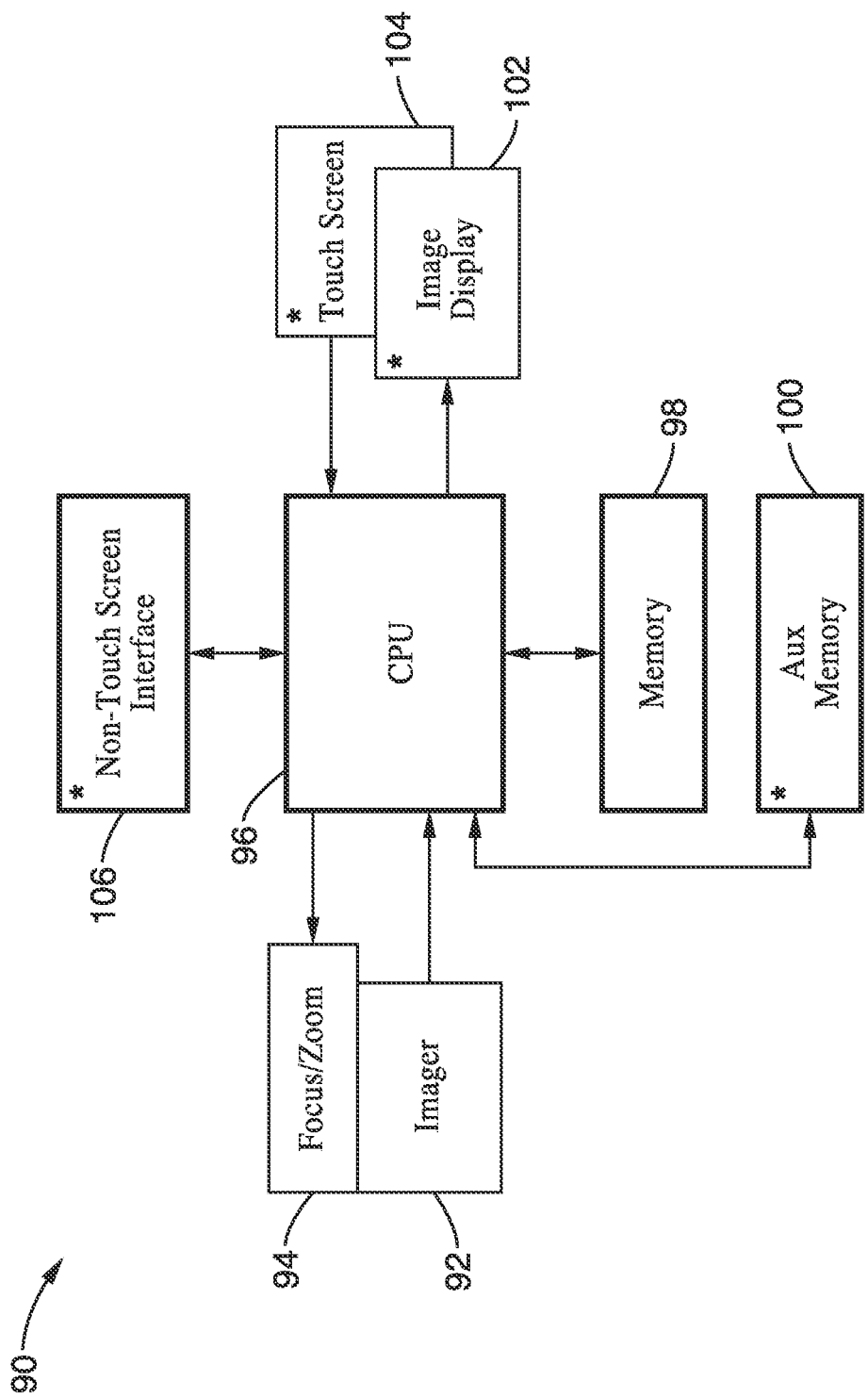
FIG. 6 is a block diagram of a camera device configured for performing the blur difference determination according to the present invention.

FIG. 6 illustrates an example embodiment 90 within which focus control adjustment is performed within an image capture device in response to a blur difference determination as described above. The image capture device 90, such as a still and/or video camera, is shown configured for autofocusing according to an implementation of the invention. A focus/zoom control 94 is shown coupled to imaging optics 92 as controlled by a computer processor (e.g., one or more CPUs, microcontrollers, and/or DSPs) 96. Computer processor 96 performs the blur difference determination within an autofocusing process in response to instructions executed from memory 98 and/or auxiliary memory 100. Shown by way of example for a camera device are an optional image display 102 and touch screen 104, which are depicted as they exist on typical camera systems, although they are not necessary for practicing the present invention.

It should be appreciated that the multi-kernel convolution procedure of FIG. 3, the blur difference determination of FIG. 4, and the autofocus steps generally shown in FIG. 5, are performed by computer processor 96 in combination with memory 98 and/or auxiliary memory 100. Although the computer processor and memory are described above in relation to an image capture device, it will be recognized that the computer and its associated programming may be used to perform the blur difference determination within any electronic device which performs image processing.

The present invention provides methods and apparatus of blur difference determination, which can be applied to a number of systems including cameras, such as for use in camera focus control.

As can be seen, therefore, the present invention includes the following inventive embodiments among others:

1. An apparatus for determining blur difference between images, comprising: a computer processor configured for processing images; programming executable on said computer processor for determining blur difference between at least a first and a second image by performing steps comprising: modeling blur change as a point spread function from a first position to a second position; approximating said point spread function as a series of convolutions; performing a first portion of said series of convolutions in response to using a first kernel having a first variance; and performing the remaining convolutions of said series of convolutions in response to using at least a second kernel having at least a second variance which is smaller than said first kernel variance.

2. The apparatus of embodiment 1, wherein said point spread function P from position A to B is given by $f_A * P = f_B$ in which * denotes the operation of two dimensional convolution, $f_A$ represents a picture captured at position A, $f_B$ represents a picture captured at position B.

3. The apparatus of embodiment 2, wherein said point spread function P is approximated in response to a series of convolutions by a blur kernel K within $P = K*K* \ldots *K$.

4. The apparatus of embodiment 1, wherein said programming is further configured for assuming that $$I_1 = \underset{l}{\operatorname{argmin}} \left\| f_A \underbrace{* K_1 * K_1 * \ldots * K_1}_{l \text{ convolutions}} - f_B \right\|,$$

$$\hat{f}_A = f_A \underbrace{* K_1 * K_1 * \ldots * K_1}_{I'_1 \text{ convolutions}} \text{ where } I'_1 = \begin{cases} 0, & \text{if } I_1 = 0, \\ I_1 - 1, & \text{otherwise.} \end{cases}$$

in which $\hat{f}_A$ represents estimated blur at position A and $f_A$ represents a picture captured at position A, $f_B$ represents a picture captured at position B, and $K_1$ is a first blur kernel.

5. The apparatus of embodiment 1, wherein said programming is further configured for determining blur difference $I_{A\_B}$ between said two kernels according to $$I_{A\_B} = I'_1 \frac{\sigma_1^2}{\sigma_2^2} + \underset{l}{\operatorname{argmin}} \left\| \hat{f}_A \underbrace{* K_2 * K_2 * \ldots * K_2}_{l \text{ convolutions}} - f_B \right\|$$

in which $\sigma_1^2$ is a variance of said first blur kernel, $\sigma_2^2$ is a variance of a second blur kernel $K_2$, $f_A$ represents a picture captured at position A, and $f_B$ represents a picture captured at position B.

6. The apparatus of embodiment 5, wherein combining the use of the at least two kernels, an accuracy of blur estimation can be obtained equivalent to performing convolutions with second blur kernel variance $\sigma_2^2$, with a computational cost that is approximately equivalent to performing convolutions with first blur kernel variance $\sigma_1^2$.

7. The apparatus of embodiment 6, wherein said programming is configured for repeatedly invoking the combining of said at least two kernels to obtain a blur estimation of any desired level of accuracy.

8. The apparatus of embodiment 1, wherein the apparatus comprises a camera device which performs said blur difference determination while focusing the camera device.

9. The apparatus of embodiment 1, wherein number of convolutions performed within said series of convolutions is inversely proportional to the variance of the kernel used for the convolutions.

10. An apparatus for automatically focusing an electronic image capturing device, comprising: a computer processor configured for processing images and controlling focus for an electronic image capturing device; and programming executable on said computer processor for adjusting focus by performing steps comprising: estimating actual subject distance in response to determining blur difference between subject images; modeling blur change as a point spread function from a first position to a second position while determining said blur difference; approximating said point spread function as a series of convolutions; performing a first portion of said series of convolutions in response to utilizing a first kernel having a first variance; performing the remaining convolutions of said series of convolutions in response to utilizing at least a second kernel having at least a second variance which is smaller than said first variance; adjusting focus of the electronic image capturing device; and iteratively performing the above steps until a desired accuracy of focus is obtained.

11. The apparatus of embodiment 1, wherein the electronic image capturing device comprises a still image camera, a video image camera, or a combination still and video image camera.

12. The apparatus of embodiment 10, wherein said point spread function P from position A to B is given by $f_A * P = f_B$ in which * denotes the operation of two dimensional convolution.

13. The apparatus of embodiment 12, wherein said point spread function P is approximated in response to a series of convolutions by a blur kernel K within $P = K * K * \ldots * K$.

14. The apparatus of embodiment 10, wherein said programming is further configured for assuming that $$I_1 = \underset{l}{\operatorname{argmin}} \left\| f_A \underbrace{* K_1 * K_1 * \ldots * K_1}_{l \text{ convolutions}} - f_B \right\|,$$

$$\hat{f}_A = f_A \underbrace{* K_1 * K_1 * \ldots * K_1}_{I'_1 \text{ convolutions}} \text{ where } I'_1 = \begin{cases} 0, & \text{if } I_1 = 0, \\ I_1 - 1, & \text{otherwise.} \end{cases},$$

in which $\hat{f}_A$ represents estimated blur at position A, $f_A$ represents a picture captured at position A, $f_B$ represents a picture captured at position B, and $K_1$ is a first blur kernel.

15. The apparatus of embodiment 10, wherein said programming is further configured for determining blur difference $I_{A\_B}$ between said two kernels according to $$I_{A\_B} = I'_1 \frac{\sigma_1^2}{\sigma_2^2} + \underset{l}{\operatorname{argmin}} \left\| \hat{f}_A \underbrace{* K_2 * K_2 * \ldots * K_2}_{l \text{ convolutions}} - f_B \right\|$$

in which $\sigma_1^2$ is a first variance of a first blur kernel, while $\sigma_2^2$ is a second variance of a second blur kernel $K_2$, $f_A$ represents a picture captured at position A, $f_B$ represents a picture captured at position B.

16. The apparatus of embodiment 15, wherein combining the use of the at least two kernels, an accuracy of blur estimation can be obtained equivalent to performing convolutions with second blur kernel having second variance $\sigma_2^2$, with a computational cost that is approximately equivalent to performing convolutions with a first blur kernel having a first variance $\sigma_1^2$; and wherein $\sigma_1^2 \geq \sigma_2^2$.

17. The apparatus of embodiment 16, wherein said programming is configured for repeatedly invoking the combining of said at least two kernels to obtain a blur estimation of any desired level of accuracy.

18. The apparatus of embodiment 10, wherein said apparatus comprises a camera device configured for performing said blur difference determination in response to focusing the camera device.

19. The apparatus of embodiment 10, wherein number of convolutions necessary to reach convergence, during said series of convolutions, is inversely proportional to the variance of the kernel used for the convolutions.

20. A method for determining blur difference between at least a first and a second image, comprising: modeling blur change as a point spread function from a first position to a second position; approximating, on a computer processor, said point spread function as a series of convolutions; performing a first portion of said series of convolutions in response to using a first kernel having a first variance; and performing the remaining convolutions of said series of convolutions in response to using at least a second kernel having a second variance which is smaller than said first variance.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for determining blur difference between captured images at different focus positions, comprising:
    a processor configured for processing images; and
    programming executable on said processor for determining blur difference between at least a first focus position in a first image and a second focus position in a second image by performing steps comprising:
        modeling blur change as a point spread function from the first focus position to the second focus position;
        approximating said point spread function as a series of convolutions;
        performing a first portion of said series of convolutions in response to using a first kernel having a first variance; and
        performing the remaining convolutions of said series of convolutions in response to using at least a second kernel having at least a second variance which is smaller than said first kernel variance to determine blur difference between said first image and said second image;
    wherein utilizing a combination of said first kernel and said second kernel during convolutions provides an accuracy of blur difference determination of said second kernel with a computational cost approaching performing convolutions with said first kernel when determining blur difference between said first image and said second image.

2. The apparatus recited in claim 1, wherein said point spread function P from position A to B is given by $f_A *P=f_B$ in which * denotes the operation of two dimensional convolution, $f_A$ represents a picture captured at position A, $f_B$ represents a picture captured at position B.

3. The apparatus recited in claim 2, wherein said point spread function P is approximated in response to a series of convolutions by a blur kernel K within $P=K*K* \ldots *K$.

4. The apparatus recited in claim 1, wherein said programming is further configured for assuming that $$I_1 = \operatorname*{argmin}_{I} \left\| f_A * \underbrace{K_1 * K_1 * \ldots * K_1}_{I \text{ convolutions}} - f_B \right\|,$$

$$\hat{f}_A = f_A * \underbrace{K_1 * K_1 * \ldots * K_1}_{I'_1 \text{ convolutions}} \text{ where } I'_1 = \begin{cases} 0, & \text{if } I_1 = 0, \\ I_1 - 1, & \text{otherwise.} \end{cases}$$

in which $\hat{f}_A$ represents estimated blur at position A and $f_A$ represents a picture captured at position A, $f_B$ represents a picture captured at position B, and $K_1$ is a first blur kernel.

5. The apparatus recited in claim 1, wherein said programming is further configured for determining blur difference $I_{A\_B}$ between said two kernels according to $$I_{A\_B} = I'_1 \frac{\sigma_1^2}{\sigma_2^2} + \operatorname*{argmin}_{I} \left\| \hat{f}_A * \underbrace{K_2 * K_2 * \ldots * K_2}_{I \text{ convolutions}} - f_B \right\|$$

in which $\sigma_1^2$ is a variance of said first blur kernel, $\sigma_2^2$ is a variance of a second blur kernel $K_2$, $f_A$ represents a picture captured at position A, and $f_B$ represents a picture captured at position B.

6. The apparatus recited in claim 5, wherein combining the use of the at least two kernels, an accuracy of blur estimation can be obtained equivalent to performing convolutions with second blur kernel variance $\sigma_2^2$, with a computational cost that is approximately equivalent to performing convolutions with first blur kernel variance $\sigma_2^2$.

7. The apparatus recited in claim 6, wherein said programming is configured for repeatedly invoking the combining of said at least two kernels to obtain a blur estimation of any desired level of accuracy.

8. The apparatus recited in claim 1, wherein apparatus comprises a camera device which performs said blur difference determination while focusing the camera device.

9. The apparatus recited in claim 1, wherein number of convolutions performed within said series of convolutions is inversely proportional to the variance of the kernel used for the convolutions.

10. An apparatus for automatically focusing an electronic image capturing device, comprising:
  a processor configured for processing images and controlling focus for an electronic image capturing device; and
  programming executable on said processor for adjusting focus by determining blur difference between captured images at different focus positions, said programming performing steps comprising:
    estimating actual subject distance in response to determining blur difference between subject images having at least a first and a second image within a sequence of captured images at a first and second focus position;
    modeling blur change as a point spread function from a first focus position to a second focus position, while determining said blur difference;
    performing a series of convolutions to approximate said point spread function;
    performing a first portion of said series of convolutions in response to utilizing a first kernel having a first variance;
    performing the remaining convolutions of said series of convolutions in response to utilizing at least a second kernel having at least a second variance which is smaller than said first variance;
    wherein utilizing a combination of said first kernel and said second kernel during convolutions provides an accuracy of blur difference determination of said second kernel with a computational cost approaching performing convolutions with said first kernel when determining blur difference between said first image and said second image;
    adjusting focus of the electronic image capturing device; and
    iteratively performing the above steps until a desired accuracy of focus is obtained.

11. The apparatus recited in claim 1, wherein the electronic image capturing device comprises a still image camera, a video image camera, or a combination still and video image camera.

12. The apparatus recited in claim 10, wherein said point spread function P from position A to B is given by $f_A *P=f_B$ in which * denotes the operation of two dimensional convolution.

13. The apparatus recited in claim 12, wherein said point spread function P is approximated in response to a series of convolutions by a blur kernel K within P=K*K* . . . *K.

14. The apparatus recited in claim 10, wherein said programming is further configured for assuming that $$I_1 = \underset{I}{\mathrm{argmin}} \left\| \underbrace{f_A * K_1 * K_1 * \ldots * K_1}_{I\ convolutions} - f_B \right\|,$$

$$\hat{f}_A = \underbrace{f_A * K_1 * K_1 * \ldots * K_1}_{I_1'\ convolutions} \text{ where } I_1' = \begin{cases} 0, & \text{if } I_1 = 0, \\ I_1 - 1, & \text{otherwise.} \end{cases},$$

in which $\hat{f}_A$ represents estimated blur at position A, $f_A$ represents a picture captured at position A, $f_B$ represents a picture captured at position B, and $K_1$ is a first blur kernel.

15. The apparatus recited in claim 10, wherein said programming is further configured for determining blur difference $I_{A\_B}$ between said two kernels according to $$I_{A\_B} = I_1' \frac{\sigma_1^2}{\sigma_2^2} + \underset{I}{\mathrm{argmin}} \left\| \hat{f}_A * \underbrace{K_2 * K_2 * \ldots * K_2}_{I\ convolutions} - f_B \right\|$$

in which $\sigma_1^2$ is a first variance of a first blur kernel, while $\sigma_2^2$ is a second variance of a second blur kernel $K_2$, $f_A$ represents a picture captured at position A, $f_B$ represents a picture captured at position B.

16. The apparatus recited in claim 15, wherein combining the use of the at least two kernels, an accuracy of blur estimation can be obtained equivalent to performing convolutions with second blur kernel having second variance $\sigma_2^2$, with a computational cost that is approximately equivalent to performing convolutions with first blur kernel having a first variance $\sigma_1^2$; and wherein $\sigma_1^2 \geq \sigma_2^2$.

17. The apparatus recited in claim 16, wherein said programming is configured for repeatedly invoking the combining of said at least two kernels to obtain a blur estimation of any desired level of accuracy.

18. The apparatus recited in claim 10, wherein said apparatus comprises a camera device configured for performing said blur difference determination in response to focusing the camera device.

19. The apparatus recited in claim 10, wherein number of convolutions necessary to reach convergence, during said series of convolutions, is inversely proportional to the variance of the kernel used for the convolutions.

20. A method for determining blur difference between at least a first and a second image captured at different focal positions, comprising:
  modeling blur change as a point spread function from a first focus position of a first image to a second focus position of a second image within a sequence of captured images;
  approximating, on a computer processor, said point spread function as a series of convolutions;
  performing a first portion of said series of convolutions in response to using a first kernel having a first variance; and
  performing the remaining convolutions of said series of convolutions in response to using at least a second kernel having a second variance which is smaller than said first variance to determine blur difference between said first image and said second image;
  wherein utilizing a combination of said first kernel and said second kernel during convolutions provides an accuracy of blur difference as determined by said second kernel with a computational cost approaching performing convolutions with said first kernel when determining blur difference between said first image and said second image.

* * * * *